United States Patent
Purdy et al.

(10) Patent No.: US 7,271,568 B2
(45) Date of Patent: Sep. 18, 2007

(54) BATTERY CHARGER FOR PORTABLE DEVICES AND RELATED METHODS

(75) Inventors: Michael L. Purdy, Cambridge (CA); Ryan Mitchell Bayne, Waterloo (CA)

(73) Assignee: Research In Motion Limited, Ontario (CA)

( * ) Notice: Subject to any disclaimer, the term of this patent is extended or adjusted under 35 U.S.C. 154(b) by 292 days.

(21) Appl. No.: 10/776,426

(22) Filed: Feb. 11, 2004

(65) Prior Publication Data
US 2005/0174094 A1 Aug. 11, 2005

(51) Int. Cl.
*H02J 7/00* (2006.01)
(52) U.S. Cl. .................. 320/106; 320/132; 320/134
(58) Field of Classification Search ............. 320/107, 320/106, 132, 134
See application file for complete search history.

(56) References Cited

U.S. PATENT DOCUMENTS

| | | | |
|---|---|---|---|
| 6,154,006 A * | 11/2000 | Hatanaka et al. | 320/109 |
| 6,184,652 B1 | 2/2001 | Yang | 320/110 |
| 6,326,771 B1 | 12/2001 | Popescu-Stanesti | |
| 6,362,610 B1 | 3/2002 | Yang | 323/281 |
| 6,456,037 B1 * | 9/2002 | Jakl et al. | 320/106 |
| 6,507,172 B2 | 1/2003 | Sherman | 320/134 |
| 6,549,401 B2 | 4/2003 | Lin et al. | 361/686 |
| 6,614,206 B1 | 9/2003 | Wong et al. | |
| 6,809,649 B1 * | 10/2004 | Wendelrup et al. | 340/636.1 |
| 2002/0038432 A1 | 3/2002 | Hsu | |
| 2003/0137277 A1 * | 7/2003 | Mori et al. | 320/132 |
| 2004/0104705 A1 * | 6/2004 | Frerking et al. | 320/104 |

OTHER PUBLICATIONS

Platform Desktop Charger (Part No. NNTN4120), Motorola, Inc., 1992-2003.

* cited by examiner

*Primary Examiner*—Karl Easthom
*Assistant Examiner*—Richard V. Muralidar
(74) *Attorney, Agent, or Firm*—Allen, Dyer, Doppelt, Milbrath & Gilchrist, P.A.

(57) ABSTRACT

A battery charger may include a charger connector to be coupled to a corresponding device connector of a portable device including a rechargeable battery. The battery charger may also include a charging circuit connected to the charger connector, and a controller connected to the charger connector and the charging circuit. The controller may be for causing a portable device connected to the charger connector to identify its corresponding portable device type and its corresponding rechargeable battery type from among a plurality of different portable device types and different battery types, and for causing the charging circuit to charge the rechargeable battery based thereon.

33 Claims, 5 Drawing Sheets

BATTERY CHARGER FOR PORTABLE DEVICES AND RELATED METHODS

FIELD OF THE INVENTION

The present invention relates to the field of battery-powered portable devices, and, more particularly, to battery chargers for such portable devices and related methods.

BACKGROUND OF THE INVENTION

Rechargeable batteries are used in a wide variety of portable devices such as laptop computers, cellular telephones, personal digital assistants (PDAs), etc. With the rapid increase in portable device technology, it is fairly common for users to replace their portable devices at frequent intervals. However, users may be required to also purchase new battery chargers when upgrading portable devices, because of different connector types or battery types used for different portable devices.

In some cases, the use of standardized interfaces or connectors for portable devices allows a single battery charger to be used for charging different portable devices. For example, many portable devices now support the universal serial bus (USB) protocol, and include one or more USB connectors which allow them to be connected to personal computers (PCs), etc. Further details regarding the USB protocol and connectors may be found in the Universal Serial Bus Specification, Revision 2.0, Apr. 27, 2000, published by USB Implementers Forum, Inc., which is hereby incorporated herein in its entirety by reference. Thus, a charger having a USB connector could potentially be used to charge different portable USB devices.

An example of such a charger is disclosed in U.S. Pat. No. 6,184,652 to Yang. This patent is directed to a mobile phone battery charger with a USB interface that includes a USB compatible plug, a DC converter, and a mobile phone battery charging plug. The USB compatible plug is inserted into a corresponding USB connector of a computer and receives electrical power therefrom. The DC converter converts the electrical power into the necessary charging voltage, which is provided to the mobile phone by the battery charging plug. The battery charger may also detect the type of mobile phone battery (e.g., Li or Ni-MH) and the quantity of electricity or charge stored in the battery. The patent states that a user accordingly need not purchase different kinds of chargers for different battery types.

Another example is disclosed in U.S. Pat. No. 6,362,610 to Yang. More particularly, this patent discloses a universal USB power supply unit which includes a USB port connector and a charging connector. The USB port connector plugs into the jack of the USB port, while the charging connector plugs into the jack of an electronic product to be charged. The current flowing into the USB port connector will then pass through an automatic voltage regulator. Disposed within a housing of the automatic voltage regulator is a DC voltage transformer which transforms the DC voltage (e.g., 5 V) coming from the USB port to the requisite voltage supplied to a power/signal connecting jack. A feedback control voltage output circuit compares the feedback voltage signal of the power/signal connecting jack and enables the DC voltage transformer to output a preset voltage. The charging connector is fitted with a power cord which includes a power/signal connector to fit the power/signal connecting jack. Moreover, a voltage parameter associated with the particular electronic device is preset within the charging connector using a variable resistor.

Despite the advantages of such chargers, problems may still arise when different types of batteries are interchanged in different portable devices. That is, different rechargeable batteries may have different charging parameters (e.g., voltage rating, current rating, etc.). Yet, these parameters may not always match with those of a given portable device. Accordingly, using chargers such as those described above where the battery and device charging parameters are not carefully matched could result in damage to the device and/or battery.

SUMMARY OF THE INVENTION

In view of the foregoing background, it is therefore an object of the present invention to provide a battery charger that may be used with numerous types of portable devices and associated batteries, and yet which may account for differences between the charging parameters thereof.

This and other objects, features, and advantages in accordance with the present invention are provided by a battery charger which may include a charger connector to be coupled to a corresponding device connector of a portable device including a rechargeable battery. The portable device and rechargeable battery may each respectively have a portable device type and a rechargeable battery type associated therewith from among a plurality of different portable device types and different battery types. The battery charger may also include a charging circuit connected to the charger connector, and a controller connected to the charger connector and the charging circuit. More particularly, the controller may be for causing a portable device connected to the charger connector to identify its corresponding portable device type and its corresponding rechargeable battery type, and cause the charging circuit to charge the rechargeable battery based thereon.

More particularly, different portable device types may have one or more different portable device charging parameters, and different battery types may similarly have one or more different battery charging parameters. For example, different types of batteries may have different voltage and/or current limits than one another, and different devices may similarly have different voltage and/or current limits as well. As such, the controller may advantageously select one or more actual charging parameters to charge the rechargeable battery based upon a comparison of the different portable device and battery charging parameters to avoid damaging one or the other.

By way of example, a particular rechargeable battery may have a higher voltage and/or current limit associated therewith than the portable device it is carried by. In such case, charging the battery at its highest rated voltage/current level could cause damage to the portable device. Accordingly, the controller may select the actual charging parameter(s) based upon a limiting one of the different portable device and battery charging parameters. Thus, the controller may prevent the battery from being charged using a charging parameter that could damage either the portable device or the battery.

Moreover, the controller may also cause the portable device to identify a battery charge level of the rechargeable battery. Accordingly, the controller may further select the actual charging parameter(s) based upon the battery charge level. Thus, for example, the controller may select an actual charging parameter such as charging time based upon the charge level of the battery and a maximum charging time for the battery.

The battery charger may further include one or more memories connected to the controller for storing the different portable device/battery charging parameters. That is, the memory may store the appropriate device and battery charging parameters for each type of portable device and rechargeable battery to be used with the battery charger. Yet, to allow for use of the charger with future generations of portable devices and batteries, the controller may advantageously enter a learning mode for learning the at least one different portable device or battery charging parameter.

More specifically, the controller may enter the learning mode upon receiving a learning mode signal from the portable device. For example, if a portable device of an unknown device type, or which has an unknown battery type, is connected to the charger connector, the controller may provide an error signal to the portable device based thereon. The portable device may then provide the learning mode signal to the controller and communicate the appropriate charging parameter(s) thereto once the controller enters the learning mode. As such, the newly learned charging parameter(s) may advantageously be stored in the memory and used upon future connections of the device and/or battery type to the battery charger.

Additionally, the charger connector may also carry communications signals between the controller and a host device (e.g., a computer) connected thereto. More particularly, the communications signals may relate to at least one charging parameter. That is, the controller may advantageously learn charging parameters from the host device as well the portable device. Furthermore, in some embodiments the charger connector may also carry communications signals between the portable device and the host device. Thus, the battery charger may provide a docking station between the portable device and the host device. This arrangement may be particularly advantageous for portable devices such as personal digital assistants (PDAs) which not only have portable batteries, but which frequently are also used to synchronize calendar, contact, email, and other data with a computer.

The controller may also monitor the charging circuit to detect a charging error during charging of the rechargeable battery. By way of example, such charging errors may include over or undervoltage conditions, over or undercurrent conditions, excessive temperatures, exceeding a maximum charging time, etc. The battery charger may also include an indicator connected to the controller for providing an error indication upon detecting the charging error. For example, the error indicator could be an LED or LCD display. Also, the charger connector may be a universal serial bus (USB) connector, for example.

A battery charging system in accordance with the invention may include a portable device including a device connector and a rechargeable battery. The system may also include a battery charger for the portable device, such as the one described briefly above.

A battery charging method aspect of the invention for a rechargeable battery carried by a portable device may include coupling a device connector of the portable device to a corresponding charger connector, and connecting a charging circuit to the charger connector. The method may further include causing the portable device to identify its corresponding portable device type and its corresponding rechargeable battery type via the charger connector from among a plurality of different portable device types and different battery types, and causing the charging circuit to charge the rechargeable battery based thereon.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
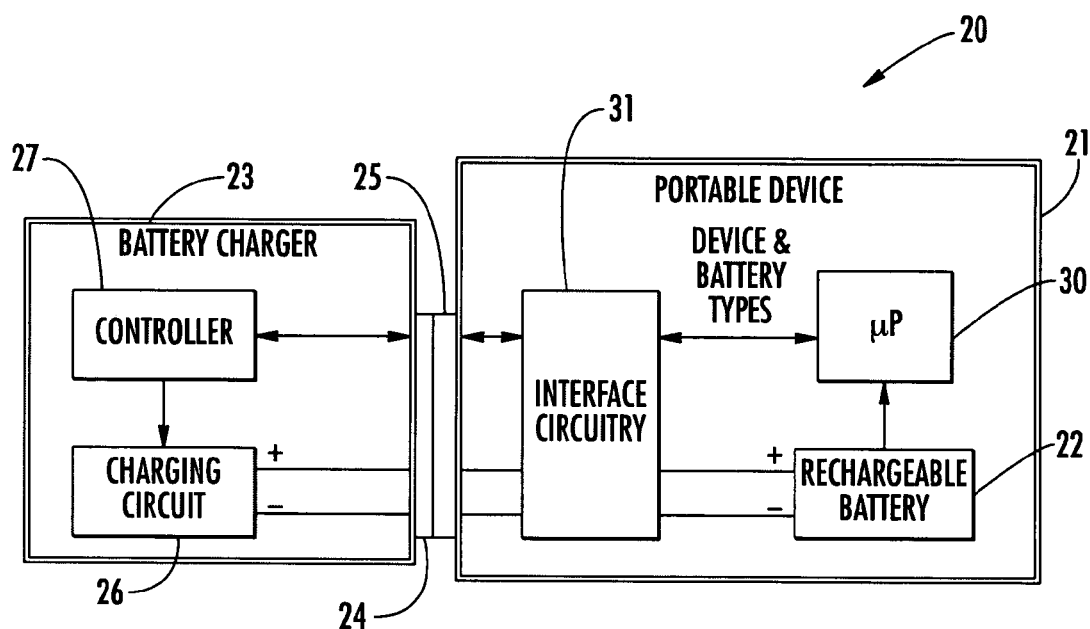
FIG. 1 is schematic block diagram of a battery charging system in accordance with the present invention.

Referring initially to FIG. 1, a battery charging system 20 includes a portable device 21 including a rechargeable battery 22 carried thereby, and a battery charger 23 for charging the rechargeable battery. An exemplary portable device suitable for use with the present invention is described in the example below with reference to FIG. 5. The charger 23 illustratively includes a charger connector 24 to be coupled to a corresponding device connector 25 of the portable device 21. The battery charger 23 also illustratively includes a charging circuit 26 connected to the charger connector 24, and a controller 27 connected to the charger connector and the charging circuit.

By way of example, the portable device 21 could be any one of a laptop computer, personal digital assistant (PDA), mobile telephone, or other portable device having a rechargeable battery. More particularly, the battery charger 23 may advantageously be used with numerous types of portable devices and rechargeable batteries as well, as will be described further below. Generally speaking, the portable device 21 will include control circuitry for performing its various device functions, such as the microprocessor 30. Moreover, many portable devices also include interface circuitry 31 for interfacing the microprocessor 21 with a data bus or cable, for example, that connects the portable device with a host device (e.g., a computer).

By way of example, the portable device 21 may be a USB compatible device, and the device connector 25 a USB connector. In this case, the interface circuitry 31 may perform a variety of operations such as connecting high or low logic signals to the differential data lines D+ and D− during enumeration with a host device, as will be appreciated by those skilled in the art. Moreover, the interface circuitry 31 may also perform signal buffering as well as signal translation for converting differential signals to data signals recognizable by the microprocessor 30, and vice-versa. The interface circuitry 31 may also connect the USB voltage references $V_{BUS}$ and GND from the host device to the appropriate components in the portable device 21 (e.g., the rechargeable battery 22 when the portable device is in a charging mode). As will be readily appreciated by those skilled in the art, different interface and control circuitry configurations may be used for the portable device 21 depending upon the given application.

For clarity of understanding, the present discussion will refer to the case in which the battery charger 23 is for charging portable devices which operate in accordance with the USB protocol and thus include a USB connector 25, as described above. However, it will be understood by those of skill in the art that the battery charger 23 may be used with numerous types of devices and operational protocols, such as those using serial or parallel communications interfaces, etc. Moreover, it should also be noted that in some embodiments the battery charger 23 may include multiple connectors 24 for different types of device connectors 25. Thus, for example, the battery charger 23 could be used to charge both USB devices and those which communicate using a serial (or other) communications interface.

Figure 2:
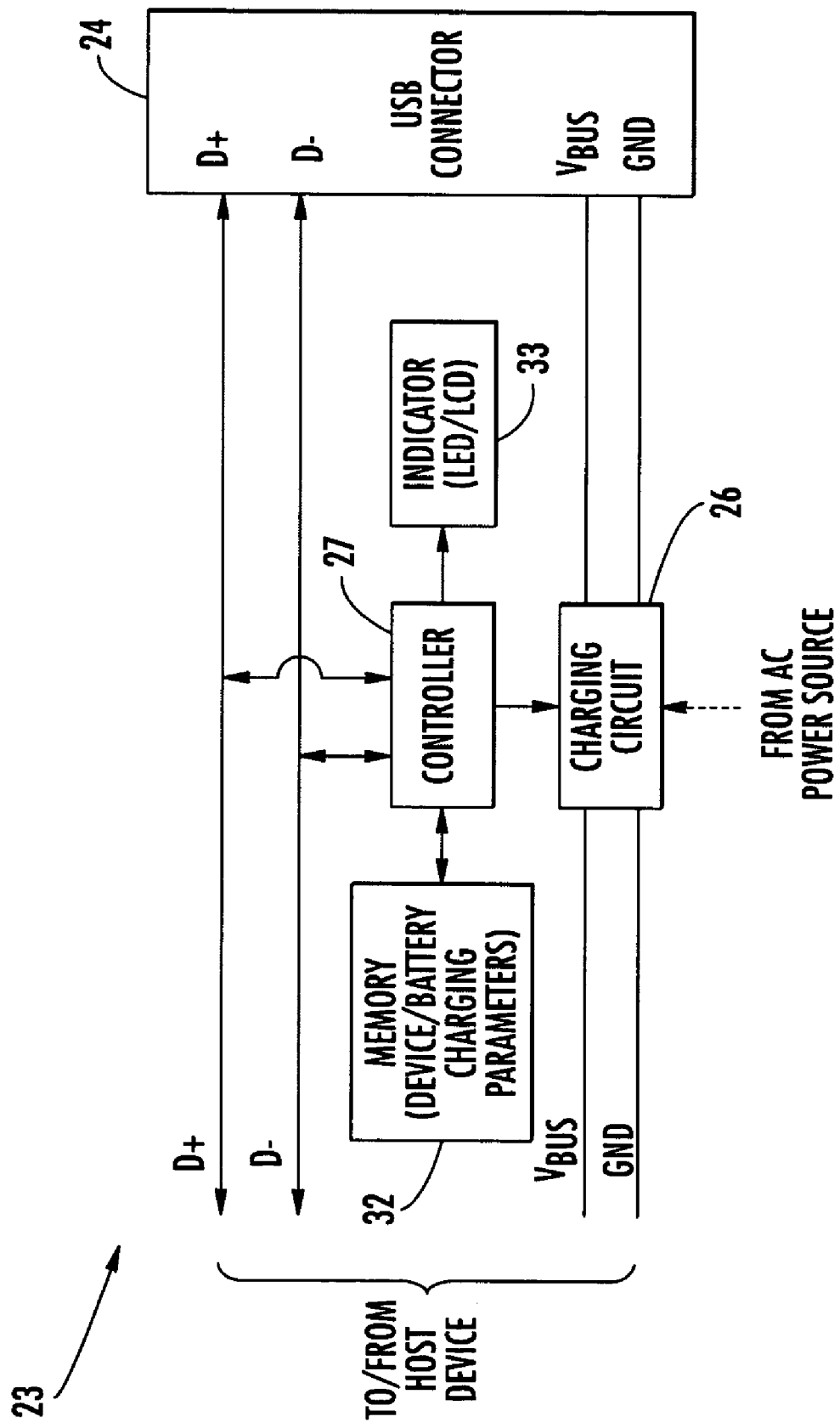
FIG. 2 is a more detailed schematic block diagram of an embodiment of the battery charger illustrated in FIG. 1.
Figure 3:
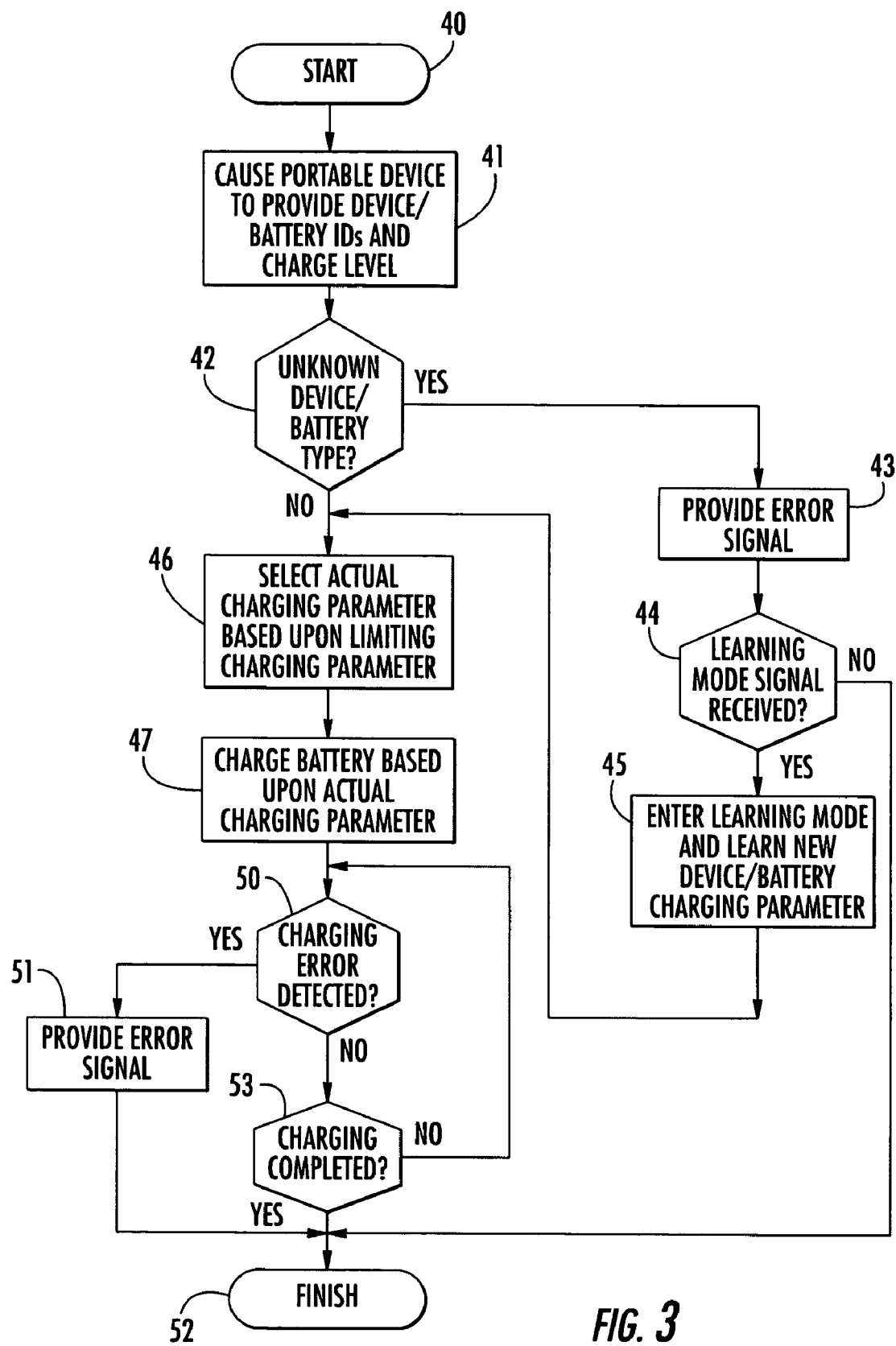
FIG. 3 is a flow diagram illustrating a battery charging method in accordance with the present invention.

An exemplary embodiment of the battery charger 23 for USB devices and operation thereof will now be described with reference to FIGS. 2 and 3. More particularly, beginning at Block 40, upon connection of the device connector 25 to the charger connector 24, the controller 27 causes the portable device 21 (i.e., the microprocessor 30) to identify its corresponding portable device type and its corresponding rechargeable battery type from among a plurality of different portable device types and different battery types, at Block 41. The device type may be stored as a device identification (ID) in a non-volatile memory of the portable device 21 (e.g., an EEPROM), and the battery type may be identified by the microprocessor 30 from an identification circuit carried by the battery 22, for example.

It should be noted that device and battery "types" may vary depending upon a given implementation of the present invention. For example, in some applications, device/battery types may be respective models of portable devices/batteries. However, in other applications, the device/battery types may correspond to a particular series of portable devices/batteries. For example, a manufacturer may make one base portable device but put different connectors thereon for different applications. As such, the base device may have the same charging parameters, but it will be assigned a different model number within a series (e.g., the 6000 series) depending upon the particular connector used therewith. Thus, in such cases the device type would include all of the devices within the given series. Similarly, device/battery type could also correspond to the manufacturer thereof in other applications (i.e., all devices by a particular manufacturer are of the same device type).

Various approaches may be used for causing the portable device 21 to identify its battery and device types. One particularly advantageous approach for USB compatible devices is for the controller 27 to initially place a logic high signal on both of the differential D+ and D− data lines when the connectors 24, 25 are first connected. This is an otherwise invalid USB enumeration state, but for an appropriately configured portable device 21 this would indicate that the device has been connected to the battery charger 23. As such, the portable device 21 may then suspend the normal USB enumeration operations it would otherwise use if connecting to a host device, for example, and instead enter a charging mode.

An exemplary implementation of this approach will now be described in greater detail. When the battery charger 23 is connected to the portable device 21, the controller 27 preferably provides an identification signal to the portable device to notify the portable device that it is connected to a power source that is not subject to the power limits imposed by the USB specification. Preferably, the portable device 21 is programmed to recognize the identification signal, and it therefore recognizes that an identification signal has been transmitted by the controller 27. After recognizing a valid identification signal, the portable device 21 is then ready to draw power from the charger 23 without performing USB enumeration.

Figure 4:
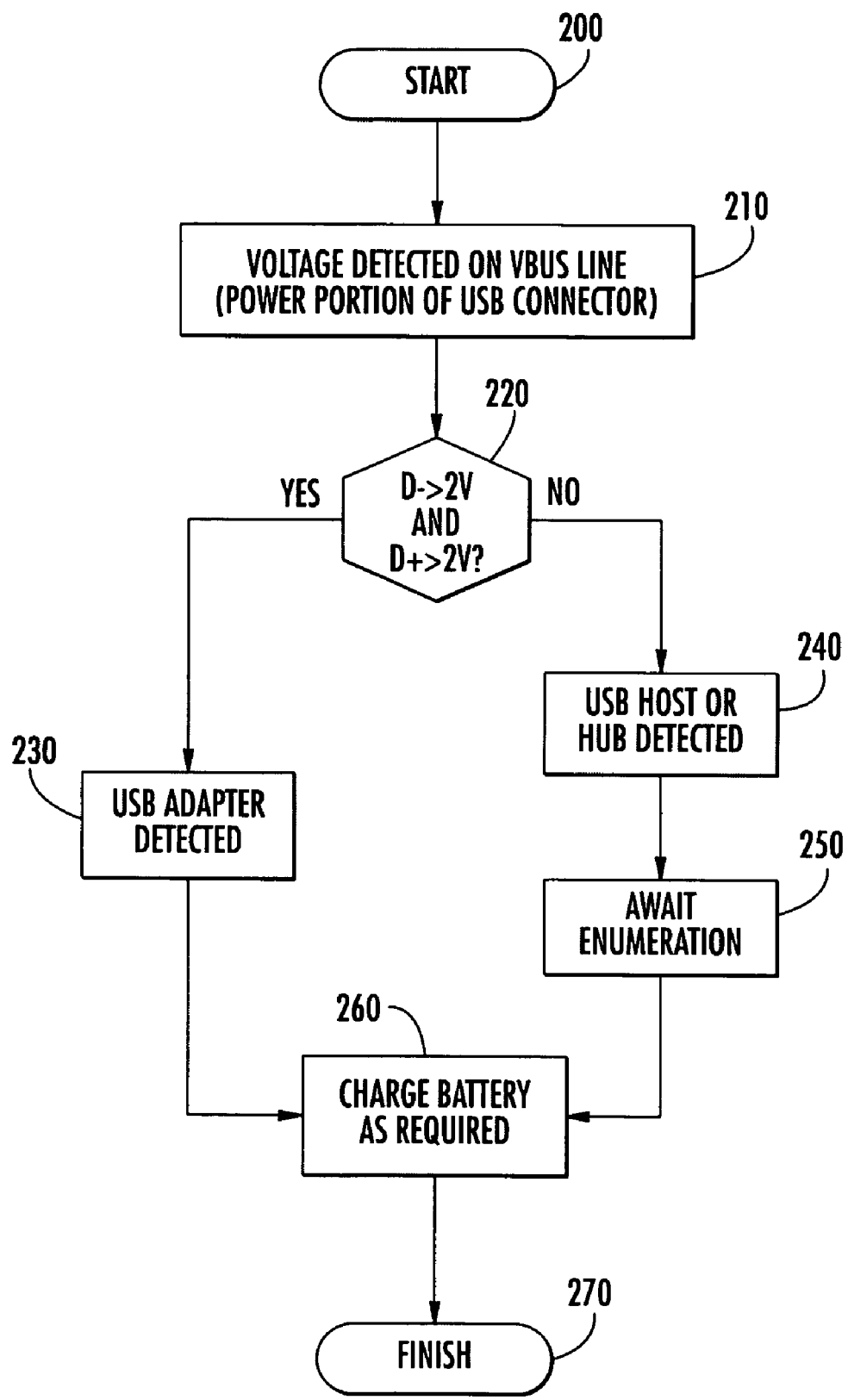
FIG. 4 is a flow diagram illustrating a method for identifying the battery charger to the portable device of FIG. 1.

The detection of the identification signal may be accomplished using a variety of methods. For example, the microprocessor 30 may detect the identification signal by detecting the presence of an abnormal data line condition at the USB port 25, for example. As noted above, one exemplary identification signal results from the application of voltage signals greater than two volts to both the D+ and D− lines by the controller 27. The foregoing will be further understood with reference to FIG. 4.

Beginning at Block 220, the portable device 21 detects the presence of a voltage on the Vbus line of the USB connector 25, at Block 210. The mobile device 21 then checks the state of the D+ and D− lines, at Block 220. The D+ and D− lines are compared to a 2V reference, for example. The controller 27 of the charger 23 may apply a logic high signal, such as +5V reference, to both the D+ and D− lines. If the voltages on both the D+ and D− lines are greater than 2V, then the portable device 21 determines that it is not connected to a typical USB host or hub, and that the charger 23 has instead been detected (Block 230). The portable device 21 is then ready to charge the battery or otherwise use power provided via the Vbus and Gnd lines (Block 260) without waiting for enumeration, and without being limited by the power restrictions imposed by the USB specification, as will be appreciated by those skilled in the art.

It should be noted that the charger 23 may also serve as an interface to a host device or hub (e.g., a personal computer (PC)) as well as a charging station in some embodiments. In this case, the portable device 21 may still go through the enumeration process. More particularly, if the portable device 21 detects the presence of a voltage on the Vbus line (meaning the charger 23 is connected to the host device) and also determines that the voltages on both the D+ and D− lines are not greater than 2V (Block 220), then the portable device determines that a USB host or hub has been detected (Block 240). A typical USB host or hub weakly holds its D+ and D− lines at zero volts when it is not connected to another device. The portable device 21 may then signal the USB host or hub to initiate the enumeration process (Block 250) and can use power provided via the Vbus and Gnd lines (Block 260) in accordance with the power limits imposed by the USB specification and/or communicate with the host device, thus concluding the illustrated method (Block 270).

Of course, battery charging could also be performed at this point, but it would be subject to the power restrictions imposed by the USB specification, as will be appreciated by those of skill in the art. The enumeration process is typically initiated after the portable device 21 applies approximately zero volts to the D− line and approximately 5V to the D+ line to inform the host of the portable device's presence and communication speed, as will also be appreciated by those skilled in the art. It should be noted that if no USB host is present, the portable device 21 may disable its typical USB functions in some embodiments, if desired.

Different portable device types will typically have one or more different portable device charging parameters, and different battery types may similarly have one or more different battery charging parameters. Table 1 provides exemplary charging parameters for two different types of USB compatible PDAs, while Table 2 provides exemplary charging parameters for two different types of PDA batteries.

TABLE 1

Exemplary Device Charging Parameters

| Device Charging Parameter | Device Type #1 | Device Type #2 |
|---|---|---|
| Overvoltage limit (V) | 6.0 | 5.25 |
| Undervoltage limit (V) | 4.0 | 4.8 |
| Overcurrent limit (mA) | 800 | 400 |
| Constant current (mA) | 750 | 350 |
| Battery full (mA) | 40 | 20 |
| Battery full (V) | 4.15 | 4.22 |

TABLE 2

Exemplary Battery Charging Parameters

| Battery Charging Parameter | Battery Type #1 | Battery Type #2 |
|---|---|---|
| Max. Charge time (Hours) | 4.0 | 8.0 |
| Battery Capacity (mAh) | 1000 | 2000 |

As may be seen from the tables, device type #1 can tolerate voltages as high as 6.0 V or as low as 4.0 V. That is, voltages outside this range could potentially damage the interface circuitry 31, as well as other components of the portable device 21, for example. Yet, device type #2 could be damaged by voltages outside of the range from 4.8 to 5.25 V. There is also a significant overcurrent limit disparity between device types #1 and #2 (i.e., 800 mA vs. 400 mA).

Accordingly, a charger set up to charge a portable device of type #1 could cause significant damage to a portable device of type #2 by applying a current/voltage outside of the above-noted ranges. For example, exceeding the maximum battery charge current could cause damage to the battery. This may be particularly problematic where both portable device types use the same type of device connector (e.g., a USB connector). That is, a user may assume that because the device connecter matches that of the charger it is safe to use the charger, which may not be true.

Moreover, even if a charger detects the appropriate voltage level for charging a particular battery, as with the prior art discussed above, a particular battery may support voltage or current levels inside the acceptable ranges for device type #1, but outside those for device type #2, for example. Thus, while the same battery type may fit in both device types and have a suitable operating voltage for both, charging the battery at or near its maximum charge limits could exceed the acceptable range for device type #2, as will be appreciated by those skilled in the art. Of course, the opposite is also true, namely that a given portable device could support charging parameters that could damage a particular battery type.

The battery charger 23 illustratively includes one or more memories 32 connected to the controller 27 for storing different portable device/battery charging parameters. That is, the memory 32 stores the appropriate device and battery charging parameters for each type of portable device and rechargeable battery 22 to be used with the battery charger 23, which may be stored based upon respective device and battery IDs. By way of example, different sets of charging parameters may be stored in the memory during manufacture of the charger 23 for each device/battery type to be used with the charger. To this end, the memory 32 may be an EEPROM, for example, which would also advantageously allow for new charging parameters to later be stored therein, as will be discussed further below. Of course, other non-volatile (or even volatile) memories could be used as well.

The charger 23 checks to see whether the device and battery types are known based upon the device and battery IDs returned by the portable device, at Block 42. If so, the controller provides an error signal to the portable device 21, at Block 43, letting it know that it (or the battery 22) is unknown and that cannot therefore cannot be performed.

In some embodiments, the battery charger 23 may further include an indicator 33 connected to the controller 27, which may be used for providing an error indication upon detection of an unknown device/battery type. Of course, if the portable device 23 includes its own indicator or display (e.g., a laptop, PDA, cell phone, etc.), such an error indication may instead (or in addition) be provided by the device indicator (not shown). By way of example, the indicator 33 may be an LED or LCD indicator, although other suitable indicators could also be used, such as audible indicators.

Even if a device or battery type is unknown to the controller 27, it may advantageously learn or download the appropriate charging parameters for the device/battery. This allows the charger 23 to be used with future generations or models of devices/batteries that are not available when the battery charger 23 is manufactured, for example.

More specifically, the controller 27 may enter a learning mode for learning the new device/battery parameters upon receiving a learning mode signal from the portable device 21, at Block 44. For example, the portable device 21 may store its own charging parameters and, responsive to receiving an unknown device error signal from the controller 27, send a designated learning mode signal that the battery charger 23 will recognize as such. The charging parameters for the rechargeable battery 22 may be stored in its identification circuit, for example.

Once the controller 27 enters the learning mode, the microprocessor 30 of the portable device 21 then communicates the appropriate charging parameters to the controller, which it then stores in the memory 32, at Block 45. The newly learned charging parameters are then available for use in charging the device and/or battery type, and these device types will be recognized by the controller 27 thereafter. If a learning mode signal is not received, the battery charger 23 will stop the charging process (Block 52).

If the device and battery types are recognized by the controller 27, it then selects actual charging parameters for charging the rechargeable battery 22 based upon a comparison of the different charging parameters for the portable device 21 and battery 22, at Block 46. More particularly, the controller 27 may select the actual charging parameters based upon a limiting one (or ones) of the different portable device an battery charging parameters, at Block 46.

Using the above exemplary charging parameters from Tables 1 and 2, for example, if a device of type #2 with a battery of type #1 is being charged, the controller 27 may limit the charging time to four hours, even if the battery voltage has not reached the maximum charge level of 4.22 V for the device. Similarly, the controller 27 may also limit the charging current to 400 mA or charging voltage to within the 4.8-5.25 V range, even though the battery type may support other values. Various other selections of limiting charging parameters are possible, as will be readily apparent to those of skill in the art based upon the examples provided herein.

Once the actual charging parameters are established, the charger 23 then causes the charging circuit 26 to charge the battery 22 in accordance with these actual charging parameters, at Block 47. The charging circuit 26 may include a power supply or transformer for converting power from either an AC or DC source to the appropriate charging voltage based upon the actual charging parameters. Of course, the charging circuit 26 need not include a power supply/transformer in all embodiments. For example, in some applications the charging circuit 26 may receive power (i.e., 5 V) from the host device via the $V_{BUS}$ line. Moreover, the power supply may be carried in a different housing than the controller 27, for example, such as in the case of a wall plug transformer. Various configurations of the charging circuitry 26 will be readily apparent to those skilled in the art based upon a given application.

The controller 27 may also cause the portable device 21 to identify a battery charge level of the battery 22 and use this information in establishing the actual charging parameters. For example, the battery charge level may be communicated to the controller 27 by the microprocessor 30 along with the portable device and battery types (Block 41). The battery charge level may also be sent to the controller 27 during charging, if desired, to help determine when the battery 22 has reached its full charge. This could be done automatically by the microprocessor 30 at predetermined intervals, or upon request by the controller 27, for example. The controller 27 may also determine when the battery 22 has been fully charged based upon a charging parameter, e.g., a steady state current value which indicates when a battery has been completely charged, for example.

In addition, the controller 27 may also monitor the charging circuit 26 to detect a charging error during charging of the battery 22, at Block 50. By way of example, such charging errors may include over or undervoltage conditions, over or undercurrent conditions, excessive temperatures, etc. Upon detecting such an error, the controller 27 may provide an error indication via the indicator 33 (and/or an indicator of the portable device 21) upon detecting a charging error. The controller 27 may also take corrective action responsive to the error condition, such as limiting the charging voltage or current, or terminating charging, as illustratively shown at Block 52. If no such error is detected, then charging continues until a predetermined event occurs, such as a maximum charging time or charge level being reached, at Block 53.

In accordance with another advantageous aspect of the invention, the charger connector 24 may also carry communications signals between the controller 27 and the host device. For example, the controller 27 may communicate with the host device over the same differential signal lines D+, D− connected to the charger connector 24. In particular, the communications signals may relate to one or more charging parameters. That is, the controller 27 may download charging parameters for unknown device/battery types from the host device instead of, or in addition to, downloading charging parameters from portable devices themselves.

Of course, this configuration also allows the charger connector 24 to carry communications signals between the portable device 21 and the host device. In other words, the battery charger 23 may thus be used as a docking station for allowing the portable device 21 to communicate with the host device while it is being charged. This arrangement may be particularly advantageous for portable devices such as PDAs. This is because PDAs not only have portable batteries which typically require regular re-charging, but they also typically need to synchronize calendar, contact, email, and other data with a computer, as will be appreciated by those of skill in the art.

A battery charging method aspect of the invention for a rechargeable battery 22 carried by a portable device 21 includes coupling a device connector 25 of the portable device to a corresponding charger connector 24, and connecting a charging circuit 26 to the charger connector. The method may further include causing the portable device 21 to identify its corresponding portable device type and its corresponding rechargeable battery type from among a plurality of different portable device types and different battery types, and causing the charging circuit 26 to charge the rechargeable battery 22 based thereon, as previously described above. Additional method aspects will be readily apparent to those skilled in the art based upon the foregoing description and will therefore not be discussed further herein.

EXAMPLE

Figure 5:
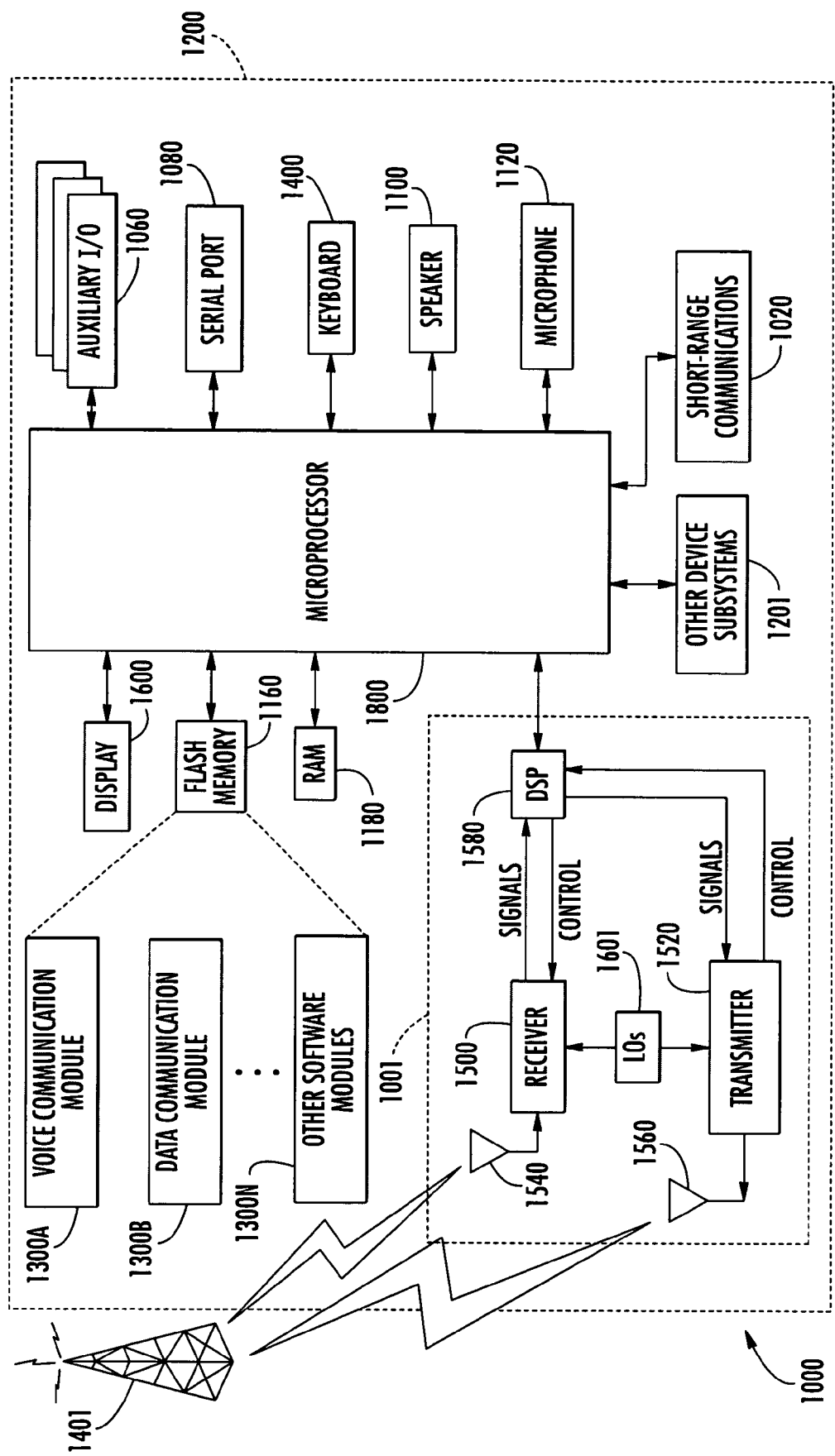
FIG. 5 is a schematic block diagram of an exemplary portable device for use with the present invention.

Turning now to FIG. 5, an exemplary portable or mobile device 1000 illustratively includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 5. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A battery charger comprising:
   a charger connector to be coupled to a corresponding device connector of a portable device including a rechargeable battery, the portable device and rechargeable battery each respectively having a portable device type and a rechargeable battery type associated therewith from among a plurality of different portable device types and different battery types having respective charging rates;
   a charging circuit connected to said charger connector; and
   a controller connected to said charger connector and said charging circuit for causing a portable device connected to said charger connector to identify its corresponding portable device type and its corresponding rechargeable battery type, and for causing said charging circuit to charge the rechargeable battery based thereon at the respective charging rate thereof.

2. The battery charger of claim 1 wherein different portable device types have at least one different portable device charging parameter; wherein different battery types have at least one different battery charging parameter; and wherein said controller selects at least one actual charging parameter to charge the rechargeable battery based upon a comparison of the at least one different portable device charging parameter and at least one different battery charging parameter.

3. The battery charger of claim 2 wherein said controller selects the at least one actual charging parameter based upon a limiting one of the at least one different portable device charging parameter and the at least one different battery charging parameter.

4. The battery charger of claim 2 wherein said controller further causes the portable device to identify a battery charge level; and wherein said controller further selects the at least one actual charging parameter based upon the battery charge level.

5. The battery charger of claim 2 wherein said controller enters a learning mode for learning the at least one different portable device or battery charging parameter upon receiving a learning mode signal therefrom.

6. The battery charger of claim 2 further comprising at least one memory connected to said controller for storing the at least one different portable device charging parameter and the at least one different battery charging parameter.

7. The battery charger of claim 2 wherein the at least one actual charging parameter comprises at least one of a voltage parameter, and a charging time.

8. The battery charger of claim 1 wherein said controller further provides an error signal to the portable device based upon an unknown portable device type or rechargeable battery type.

9. The battery charger of claim 1 wherein said controller monitors said charging circuit to detect a charging error during charging of the rechargeable battery.

10. The battery charger of claim 9 further comprising an indicator connected to said controller for providing an error indication upon detecting the at least one charging error.

11. The battery charger of claim 1 wherein said charger connector also carries communications signals between the portable device and a host device connected thereto.

12. The battery charger of claim 1 wherein said charger connector also carries communications signals between said controller and a host device connected thereto.

13. The battery charger of claim 12 wherein the communications signals relate to at least one charging parameter.

14. The battery charger of claim 1 wherein said charger connector comprises a universal serial bus (USB) connector.

15. A battery charging system comprising:
a portable device comprising a device connector and including a rechargeable battery, the portable device and rechargeable battery each respectively having a portable device type and a rechargeable battery type associated therewith from among a plurality of different portable device types and different battery types having respective charging rates; and
a battery charger comprising
a charger connector to be coupled to said device connector,
a charging circuit connected to said charger connector, and
a controller connected to said charger connector and said charging circuit for causing the portable device to identify its corresponding portable device type and its corresponding rechargeable battery type, and for causing said charging circuit to charge the rechargeable battery based thereon at the respective charging rate thereof.

16. The system of claim 15 wherein different portable device types have at least one different portable device charging parameter; wherein different battery types have at least one different battery charging parameter; and wherein said controller selects at least one actual charging parameter to charge the rechargeable battery based upon a comparison of the at least one different portable device charging parameter and at least one different battery charging parameter.

17. The system of claim 16 wherein said controller selects the at least one actual charging parameter based upon a limiting one of the at least one different portable device charging parameter and the at least one different battery charging parameter.

18. The system of claim 16 wherein said controller further causes said portable device to identify a battery charge level; and wherein said controller further selects the at least one actual charging parameter based upon the battery charge level.

19. The system of claim 16 wherein said controller enters a learning mode for learning the at least one different portable device or battery charging parameter upon receiving a learning mode signal therefrom.

20. The system of claim 15 wherein said controller monitors said charging circuit to detect a charging error during charging of the rechargeable battery.

21. The system of claim 15 wherein said charger connector also carries communications signals between the portable device and a host device connected thereto.

22. The system of claim 15 wherein said charger connector also carries communications signals between said controller and a host device connected thereto.

23. The system of claim 22 wherein the communications signals relate to at least one charging parameter.

24. The system of claim 15 wherein said charger connector and said device connector each comprises a universal serial bus (USB) connector.

25. A battery charging method for a rechargeable battery carried by a portable device, the portable device and rechargeable battery each respectively having a portable device type and a rechargeable battery type associated therewith from among a plurality of different portable device types and different battery types having respective charging rates, the method comprising:
coupling a device connector of the portable device to a corresponding charger connector;
connecting a charging circuit to the charger connector; and
causing the portable device to identify its corresponding portable device type and its corresponding rechargeable battery type via the charger connector, and causing the charging circuit to charge the rechargeable battery based thereon at the respective charging rate thereof.

26. The method of claim 25 wherein different portable device types have at least one different portable device charging parameter; wherein different battery types have at least one different battery charging parameter; and further comprising selecting at least one actual charging parameter to charge the rechargeable battery based upon a comparison of the at least one different portable device charging parameter and at least one different battery charging parameter.

27. The method of claim 26 wherein selecting comprises selecting the at least one actual charging parameter based upon a limiting one of the at least one different portable device charging parameter and the at least one different battery charging parameter.

28. The method of claim 26 further comprising causing the portable device to identify a battery charge level of the rechargeable battery; and wherein selecting comprises selecting the at least one actual charging parameter further based upon the battery charge level.

29. The method of claim 26 wherein the at least one actual charging parameter comprises at least one of a voltage parameter and a charging time.

30. The method of claim 25 further comprising providing an error signal to the portable device based upon an unknown portable device type or rechargeable battery type.

31. The method of claim 25 further comprising monitoring the charging circuit to detect a charging error during charging of the rechargeable battery.

32. The method of claim 25 wherein the charger connector also carries communications signals between the portable device and a host device connected thereto.

33. The method of claim 25 wherein the charger connector comprises a universal serial bus (USB) connector.

* * * * *